July 2, 1940.  E. M. ZIEMER  2,206,295
CONNECTOR
Filed Sept. 21, 1936
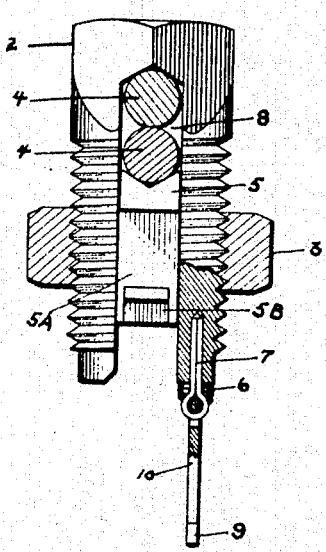
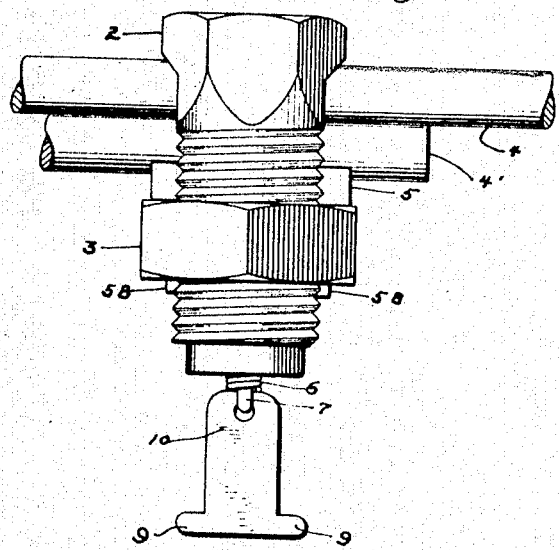
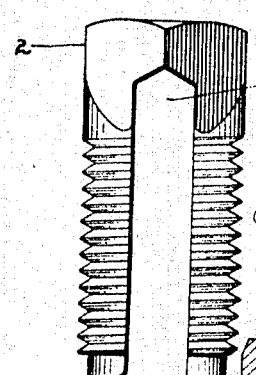
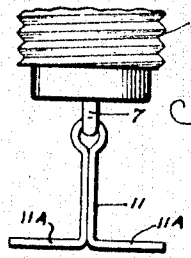
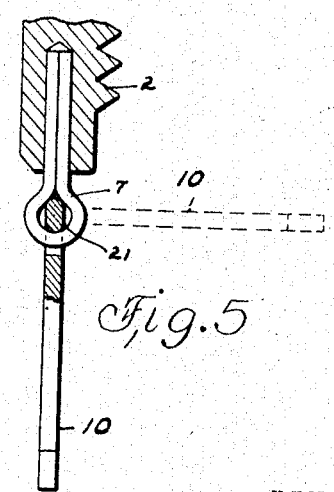
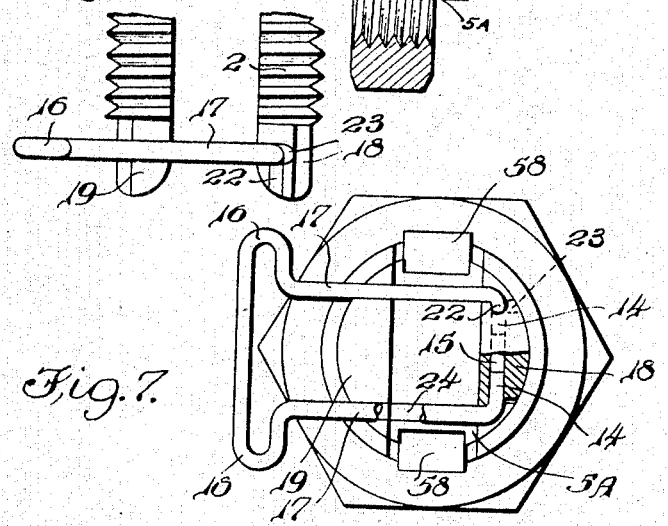
INVENTOR.
Elizabeth M. Ziemer
BY
Chester W. Brown
ATTORNEY.

Patented July 2, 1940

2,206,295

UNITED STATES PATENT OFFICE 2,206,295

CONNECTOR

Elizabeth M. Ziemer, South Milwaukee, Wis., assignor to Line Material Company, South Milwaukee, Wis., a corporation of Delaware Application September 21, 1936, Serial No. 101,755

14 Claims. (Cl. 24—243)

This invention relates to improvements in connectors.

It is an object of this invention to provide for a connector comprising a threaded bifurcated bolt and a nut threadable thereon, a nut retainer freely removably mounted on the end of one of the bifurcations of the bolt for supporting the nut in spaced relation to the bifurcated end of the bolt.

It is also an object of this invention to provide for a nut retainer pivotally mounted on the end of the connector bolt, means for holding the retainer in any one of a plurality of angular positions relative to the bolt, whereby to receive the nut from the bolt, to support the nut in a position laterally offset therefrom, or to hold the retainer laterally across the bifurcated end of the bolt when the nut has been threaded thereon.

A still further object is to provide an inexpensive retainer which can be easily assembled on the connector and which will permit a minimum of insulating tape to be wound about the connector when the latter is operatively securing wires together.

Other advantages will become apparent as the description proceeds.

In the drawing:

Fig. 1 is a view in side elevation, a portion being broken away to illustrate a preferred form of this invention.

Fig. 2 is a view in side elevation of the same device and taken at right angles relative to Fig. 1.

Fig. 3 is a view similar to Fig. 1 showing the connector as it appears before engagement with wires.

Fig. 4 is a fragmentary view in side elevation showing a modified form of this invention.

Fig. 5 is a fragmentary sectional view in side elevation illustrating a further modified form of the invention.

Figs. 6 and 7 are enlarged views which illustrate another modified form of this invention.

Like parts are identified by the same reference characters throughout the several views.

The connector shown in Figs. 1 to 3, inclusive, comprises a wire-receiving member or bifurcated bolt 2, a clamping jaw 5 movable between the bifurcations of the bolt, and a clamping nut 3 rotatable on the jaw 5 and threadable on the bifurcations of the bolt 2. The clamping jaw 5 is provided with a shank 5A extending through the nut 3 and provided with lugs 5B extending laterally of the shank 5A and in parallel relationship to the clamping jaw 5, thereby retaining the nut 3 rotatably connected with the clamping jaw 5. As will be observed, the lugs 5B are sheared outwardly from the shank 5A.

One of the bifurcations of the bolt 2 is provided with a nut retainer or supporting member 10 having nut-engaging ears 9 extending laterally thereof for engagement with the nut 3 when the latter is removed from the bolt 2. The retainer 10 is pivotally supported by means of a cotter pin 7 having a shank portion which extends longitudinally into an aperture in one of the bifurcations of the bolt 2 and frictionally engages the walls of the aperture. When it is desired to remove the retainer 10 from the bolt, it is only necessary to pull the cotter pin 7 from the aperture.

The retainer 10 may be moved so that it extends laterally to one side of the bolt 2 as shown in Fig. 3 or it may be moved to a position extending laterally across the end of the bolt 2. A spring 6 is mounted on the cotter pin 7 and engages the pivoted end of the retainer 10 with sufficient force to hold the retainer in either of the above described positions or in the position illustrated in Figs. 1 and 2.

The device illustrated in Figs. 1 to 3, inclusive, is operated in the following manner:

The connector is normally supplied in its assembled relationship as illustrated in Fig. 3. When the nut 3 is held in the position relative to the bolt 2 as illustrated in Fig. 3, the bolt 2 may be mounted on a line conductor 4, shown in Figs. 1 and 2, after which the retainer 10 will be swung downwardly on the cotter pin until it reaches a position such as illustrated in Fig. 1. The nut 3 will then be moved upwardly for engagement with the threads on the bolt 2 and a lead-off wire 4' may then be inserted into the slot 8. Obviously, further rotation of the nut 3 onto the bolt 2 will cause the jaw 5 to clampingly engage the lead-off wire 4' and secure it in contact with the line conductor or wire 4. As soon as the connector has been thus rendered operative for securing wires together, the retainer 10 may be removed from the connector by merely pulling the cotter pin out of its aperture in the bolt.

If it is preferred not to remove the retainer 10, it may be moved about its pivot to a position extending laterally across the end of the bolt 2. Insulating tape may then be wound about the connector and the retainer to cover all live parts of the structure.

In Fig. 4, the nut retainer comprises a cotter pin 11 pivotally mounted on the cotter pin 7 and having its ends bent laterally in opposite directions to provide nut-engaging ears 11A. These ears 11A serve the same purpose as the ears 9 shown in Figs. 1 to 3, inclusive.

Fig. 5 shows a structure which appears to be somewhat similar to that illustrated in Figs. 1 to 3, inclusive. However, in Figs. 1 to 3, inclusive, the eye of the cotter pin 7 is substantially circular, whereas, in Fig. 5, the eye of the cotter pin is preferably elliptical in shape so that its major axis extends in a transverse direction relative to the bolt 2 and its minor axis extends in a direction longitudinally relative to the bolt 2. Thus, when the retainer 10 is positioned as shown in Fig. 5, the eye of the cotter pin 7 will tend to hold the retainer 10 in that position due to the fact that the portion 21 of the retainer is substantially the same dimension vertically as the dimension of the major axis of the eye of the cotter pin. When the retainer 10 is moved to a position extending laterally from the bolt 2, the previously noted dimension of the portion 21 will coincide with the major axis of the eye of the cotter pin and will support the retainer in the position illustrated in broken lines. Thus, we find that Fig. 5 illustrates a modified form which dispenses with the spring 6 shown in Figs. 1 to 3, inclusive.

In Figs. 6 and 7, the retainer comprises a wire bent to provide nut-engaging ears 16, relatively parallel legs 17 extending therefrom, and pivot fingers 14 extending into an aperture or hole 15 bored laterally of the bolt comprising a pivot bearing for the fingers 14. As shown, the hole 15 is disposed in the shouldered end 18 of one of the bifurcations, a corresponding shouldered end 19 being provided upon the other bifurcation of the bolt 2 and adapted to be received between the legs 17 of the retainer. Preferably, the shouldered end 19 frictionally engages the legs 17 to thereby hold the retainer in the position illustrated in Figs. 6 and 7.

As clearly shown in Fig. 6, the shouldered end 18 is provided with slots or grooves 22 extending longitudinally relative to the bolt 2 and adapted to receive the legs 17 of the retainer. These slots 22 register with the hole 15 and are adapted to hold the retainer in an extended position downwardly relative to Fig. 6.

Lug 18 is also provided with slots or grooves 23 extending laterally across the lug and radially from the aperture 15. These slots 23 are adapted to receive the legs 17 of the retainer when the latter is moved to a position extending laterally from the bolt 2.

As shown in Fig. 7, the shank 5A of the clamping jaw may be provided with laterally extending slots 24 adapted to receive the legs 17 of the retainer, if the shank 5A has not been moved sufficient distance into the slot 8 of the bolt to clear the retainer when the latter extends across the end of the bolt.

If it is desired, the retainer illustrated in Figs. 6 and 7 may be removed from the bolt by merely springing the legs apart to remove the fingers 14 from the aperture 15. Obviously, the connector may be taped with the retainer in the position illustrated in Figs. 6 and 7, or with the retainer removed as previously indicated.

One of the reasons for providing either the spring 6 shown in Figs. 1 to 3, inclusive, the snapping arrangement for the retainer illustrated in Fig. 5, or the frictional engagement of the retainer by the shouldered end 19 as illustrated in Figs. 6 and 7, is to hold the retainer in substantially perfect contact with the part upon which it is pivoted, thereby avoiding possible radio interferences which may be caused if the retainer has not been removed from the connector or has not been adequately covered by tape in case it is not removed from the connector.

From the foregoing description and the drawing, it will be apparent that I have provided for connectors a retainer which is readily removable from the connector, which will cause no radio interferences, which will be securely held in any one of a plurality of positions selected by the operator, which is inexpensive to manufacture and easy to assemble, and which will permit a minimum of insulating tape to be used in covering the connector and all of its associated parts.

I claim:

1. In combination with a connector comprising a threaded bifurcated bolt, a clamping jaw movable between the bifurcations of said bolt, and a nut rotatably secured on said jaw and threadable on said bolt; a support removably mounted on the end of one of said bifurcations and including a nut retainer pivotally mounted on said support and adapted to receive and support the nut and jaw, and releasable holding means interacting between said bolt and retainer for holding said retainer in any one of a plurality of positions angularly relative to the bolt.

2. In combination with a connector comprising a threaded bifurcated bolt, a clamping jaw movable between the bifurcations of said bolt, and a nut rotatably secured on said jaw and threadable on said bolt; a support mounted on the end of one of said bifurcations and including a nut retainer pivotally mounted on said support and adapted to receive and support the nut and jaw, and releasable holding means interacting between said bolt and retainer for holding said retainer in any one of a plurality of positions angularly relative to the bolt.

3. In combination with a connector comprising a bifurcated member having at one end of one of its bifurcations an aperture comprising a pivot bearing transversely thereof, a movable clamping jaw including a shank provided with spaced slots, a clamping nut rotatably mounted on said shank and threadedly engaged with said member for effecting longitudinal movement of said movable jaw relative to said member; of a retaining means having spaced legs and nut-engaging ears, said legs being turned inwardly at their ends to provide pivots, said pivots being mounted in said apertures, thereby facilitating lateral movement of said retainer relative to said member, said legs being receivable in said slots when said nut is in a clamping position.

4. In combination with a connector comprising a bifurcated member having a lug at one end of one of its bifurcations and being provided with a pivot bearing transversely thereof, said lug being provided with grooves cut at substantially right angles to each other, a movable clamping jaw having a shank provided with spaced slots and a clamping nut rotatably mounted on said shank and threadedly engaged with said member; of a retainer comprising a wire bent to provide nut-supporting ears and legs receivable in said grooves and removably pivoted in said bearings, whereby said retainer may be removably held in any one of a plurality of positions, said legs being receivable in said spaced slots in said shank.

5. In combination with a connector comprising a threaded bifurcated bolt, a clamping jaw movable between the bifurcations of said bolt, and a nut rotatably secured to said jaw, one of said bifurcations having an aperture in the end thereof; of a cotter pin having a shank portion removably held in said aperture and provided with an eye, and a retainer having an aperture providing a pivot portion pivotally mounted in said eye, said retainer having nut-supporting means.

6. In combination with a connector comprising a threaded bifurcated bolt, a clamping jaw movable between the bifurcations of said bolt, and a nut rotatably secured to said jaw, one of said bifurcations having an aperture in the end thereof; of a cotter pin removably held in said aperture, a retainer pivotally mounted on said cotter pin and having nut-supporting means, and resilient means coacting between said bolt and retainer adapted to hold said retainer in any one of a plurality of positions angularly relative to said bolt.

7. In combination with a connector comprising a threaded bifurcated bolt, a clamping jaw movable between the bifurcations of said bolt, and a nut rotatably secured to said jaw, one of said bifurcations having an aperture in the end thereof; of a cotter pin removably held in said aperture, a retainer pivotally mounted on said cotter pin and having nut-supporting means, and resilient means adapted to hold said retainer in any one of a plurality of positions angularly relative to said bolt, said resilient means comprising a spring mounted on said cotter pin and held under compression between said bolt and retainer.

8. In combination with a connector comprising a threaded bifurcated bolt, a clamping jaw movable between the bifurcations of said bolt, and a nut rotatably secured to said jaw, one of said bifurcations having an aperture in the end thereof; of a cotter pin removably held in said aperture, the eye of said cotter pin being oval-shaped and having its major axis transversely of the pin, and a retainer having a pivot portion in said eye and dimensioned in one direction to correspond to the dimension of said major axis.

9. In combination with a connector comprising a threaded bifurcated bolt, a clamping jaw movable between the bifurcations of said bolt, and a nut rotatably secured to said jaw, one of said bifurcations having an aperture in the end thereof; a cotter pin including a shank portion frictionally held in said aperture and an eye, a retainer including an apertured portion pivotally mounted in said eye and having nut-supporting means, and spring means on said pin and interposed between the bolt and the apertured portion on said retainer adapted to hold said retainer in any one of a plurality of positions angularly relative to said aperture.

10. In combination with a connector comprising a threaded bifurcated bolt, a clamping jaw movable between the bifurcations of said bolt, and a nut rotatably secured to said jaw, one of said bifurcations having an aperture in the end thereof extending in parallel relation to the periphery of said bolt; a cotter pin comprising a shank portion frictionally held in said aperture and an eye, and a retainer having a pivot portion in said eye, said eye and pivot portion being relatively dimensioned to include cooperating means adapted to hold said retainer in transverse relation to said bolt.

11. In combination with a connector comprising a threaded bifurcated bolt, a clamping jaw movable between the bifurcations of said bolt, and a nut rotatably secured to said jaw, one of said bifurcations having an aperture in the end thereof; a cotter pin including a shank portion mounted in said aperture and an oval-shaped eye, and a retainer including a pivot portion in said eye and dimensioned in one direction greater than the dimension of the minor axis of said eye.

12. In combination with a connector comprising a threaded bifurcated bolt, a clamping jaw movable between the bifurcations of said bolt, and a nut rotatably secured to said jaw, one of said bifurcations having an aperture in the end thereof; a cotter pin including a shank portion mounted in said aperture and an eye, and a retainer including a pivot portion in said eye.

13. In combination with a connector comprising a threaded bifurcated bolt, a clamping jaw movable between the bifurcations of said bolt, a nut rotatably secured to said jaw, one of said bifurcations having an aperture in the end thereof extending longitudinally of said bolt; a cotter pin including a shank portion mounted in and retained in said aperture and an eye, and a retainer including a pivot portion in said eye pivotally supporting said retainer.

14. In combination with a connector comprising a threaded bifurcated bolt, a clamping jaw movable between the bifurcations of said bolt, and a nut rotatably secured to said jaw, one of said bifurcations having an aperture in the end thereof; a cotter pin including a shank portion mounted in said aperture and an eye, and a T-shaped retainer including a pivot portion in said eye at the end of the leg spaced from the head of the T-shaped retainer.

ELIZABETH M. ZIEMER.